Feb. 21, 1956  G. P. KILLIAN ET AL  2,735,154
PIPE JOINT MOLD
Filed July 12, 1951  2 Sheets-Sheet 1

INVENTOR
George P. Killian,
Marvin F. Hall and
Wharton S. Sanders
BY Mason, Fenwick & Lawrence
ATTORNEYS Feb. 21, 1956 G. P. KILLIAN ET AL 2,735,154
PIPE JOINT MOLD
Filed July 12, 1951 2 Sheets-Sheet 2
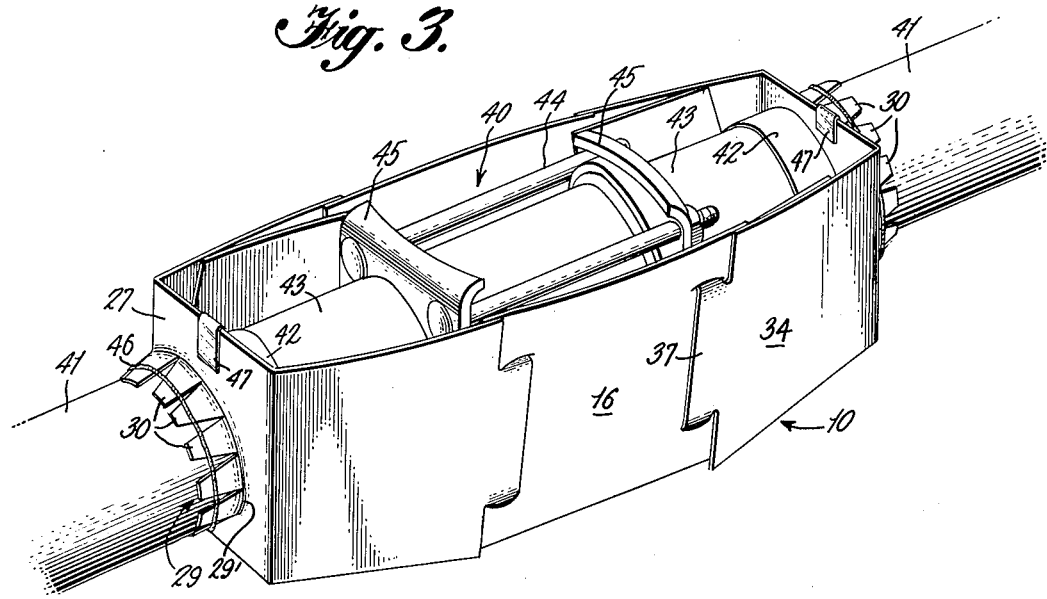
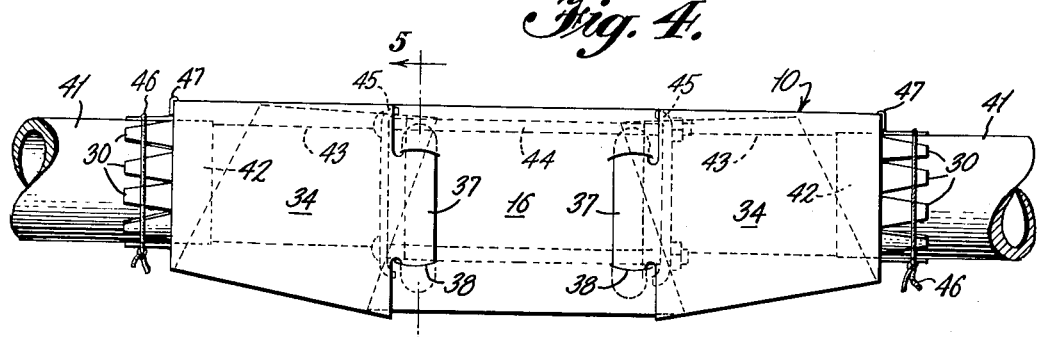
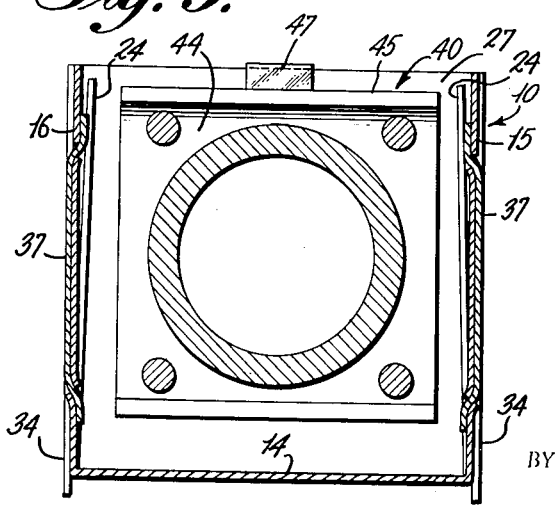
INVENTORS
George P. Killian,
Marvin F. Hall and
Wharton S. Sanders
BY Mason, Fenwick & Lawrence
ATTORNEYS

United States Patent Office 2,735,154
Patented Feb. 21, 1956

2,735,154

PIPE JOINT MOLD

George P. Killian, Marvin F. Hall, and Wharton S. Sanders, Scarsdale, N. Y., assignors to Better Boxes, Incorporated, Washington, D. C., a corporation of Delaware Application July 12, 1951, Serial No. 236,352

4 Claims. (Cl. 25—127)

The present invention relates in general to molds for corrosion resistant coating materials to be applied to pipe joints, couplings and the like. More particularly, the present invention relates to collapsible mold troughs to be applied to uncoated coupling joints between coated pipe sections, which are adapted to mold a corrosion resistant coating about the joint to form a continuous homogeneous extension of the pipe coatings.

The invention is particularly designed for use in connection with pipe lines or mains for distributing city gas and will be described in connection with such use. It is to be undertsood, however, that the invention is suitable for use in connection with piping systems generally, such as lead coated joints in plumbing systems and the like.

One of the paramount problems occurring in connection with piping systems for city gas is that of corrosion control or mitigation. Pipe lines and piping systems for conveying fuel in a gaseous state must be handled in a particular manner in coupling the various pipe sections making up the system to prevent the escape of gas from such system. As such gas pipe lines generally must be laid in the soil, prevention or control of corrosion becomes one of the principal problems in preventing leakage in such systems.

Steel pipe, which is most desirable in such a gas pipe line, intensifies the corrosion problem, as contact of corrosive soil with the surface of the steel pipe sets up galvanic action which releases steel ions from the pipe. This release of steel ions is exhibited as corrosion. In order to avoid the corrosive effect of soil on the steel surface, the pipe must be coated continuously throughout to insulate the surface from contact with soil. Steel pipe sections for use in such pipe lines are now provided for commercial use with a layer of coating material extending continuously to a point adjacent each end of the pipe section. These coatings are conventionally formed of hot coating enamel made out of pitch, asphalt or other bituminous products.

It should be apparent, however, that the coupling elements between the respective pipe sections are normally in an uncoated state and must be completely coated with such corrosion resistant material after the coupling has been assembled in position in the pipe line.

It is conventional practice in forming such a coating surrounding the coupling, to wrap sheet material about the coupling elements and extending over the ends of the coating formed on the adjacent pipe sections to define a receptacle or container for molten material to be poured about the joint. The sheet material forming the wrapping is bound at each end to the surface of the adjacent pipe sections and openings are left in portions of the upper wrapping through which the molten coating material can be poured.

Such a method of coating the joints is attended by many difficulties and disadvantages. Skilled labor must be employed for wrapping the joints, and the process of wrapping the joint and pouring the molten coating material about the joint requires two or three laborers to accomplish the several simultaneous operations. The coupling area must be very carefully and precisely wrapped to be sure that the poured coating extends over the entire joint area extending to and overlapping a portion of the ends of the coating on the adjacent pipe sections.

Further, this method of coating pipe joints does not provide assurance of adequate protection for the bottom of the pipe. The pipe is usually resting in a trench with the sheet material wrapping extending underneath the pipe, and it is particularly difficult to avoid the wrapping being pressed against the bottom of the pipe joint and thereby preventing the bottom portions of the pipe joint from being adequately coated.

An object of the present invention, therefore, is the provision of a novel mold for coating pipe joints, couplings and the like which avoids the difficulties and disadvantages attendant to the above-described methods of coating pipe joints.

Another object of the present invention is the provision of a novel mold to be applied to uncoated coupling joints in pipe lines having coated pipe sections, which is adapted to form a corrosion resistant coating about the joint extending continuously between the coatings on the adjacent pipe sections.

Another object of the present invention is the provision of a mold trough for forming corrosion resistant coatings about pipe joints, which is collapsible in character and can be stored in flat form.

Another object of the present invention is the provision of mold troughs for forming corrosion resistant coatings about pipe joints which is assembled from a flat blank of sheet material.

Another object of the present invention is the provision of a collapsible mold trough for forming corrosion resistant coatings about pipe joints which is arranged to insure the formation of a continuous corrosion resistant coating about the exposed portions of the pipe joint of proper thickness throughout.

Other objects, advantages and capabilities of the present invention will become apparent from the following detailed description, taken in conjunction with the accompanying drawings, wherein only a preferred embodiment of the invention is shown.

In the drawings:

Figure 3 is a perspective view of a mold trough embodying the present invention assembled on a pipe coupling or field joint;

Figure 4 is an elevation of a collapsible mold trough embodying the present invention assembled about a coupling or field joint in a pipe line system; and, Figure 5 is a vertical transverse section of the collapsible mold trough illustrated in assembled position on a pipe line, taken on the lines 5—5 of Figure 4.

Figure 1:
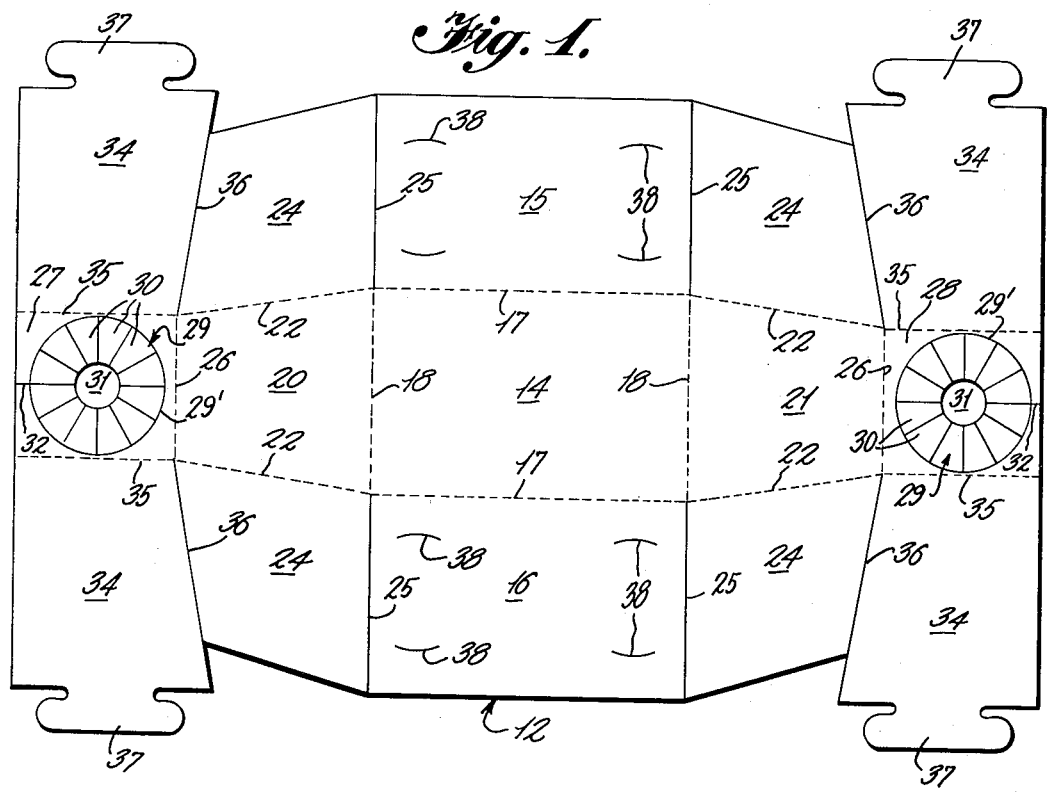
Figure 1 is a plan view of a blank of sheet material adapted to be folded and formed into a mold trough embodying the present invention.

Referring to the drawings, wherein like reference characters designate corresponding parts throughout the several figures, the present invention comprises a collapsible mold trough, indicated generally by the reference character 10, forming an upwardly opening receptacle for molding a body of molten coating material about a desired surface. The collapsible mold trough is adapted to be stored in flat condition and to this end is formed of a blank 12 of cardboard or other sheet material adapted to be folded into the desired trough shape.

The cardboard blank 12 is generally rectangular in shape, and the various scored and cut portions thereof are symmetrical relative to the longitudinal medial axis of the blank. The blank 12, as indicated in Figure 1, comprises a central bottom portion 14 of rectangular shape bounded by rectangular side wall flaps 15 and 16 separated from the central bottom portion 14 by rectilinear scores 17. At the ends of the central bottom portion 14 defined by scores 18, are bottom portions 20 and 21 in the shape of isosceles trapezoids having lateral scores 22, converging in a direction away from the central bottom portion 14. Extending to either side of the bottom portions 20 and 21 are tuck flaps 24, each separated from the adjacent side wall flaps 15 and 16 by means of slits 25 extending from the outer edges of the flaps 15 and 16 to the scores 17.

Connected to the ends of the portions 20 and 21 and separated therefrom by scores 26 are rectangular end walls 27 and 28 adapted to be folded into an upright position along the scores 26. The end portions 27 and 28 are provided with a circular opening 29 defined by circular score lines 29' and orange peel sectors 30 extending to a central opening 31. The orange peel sectors 30 are adapted to be folded outwardly along the score lines 29' to define circular openings of the diameter of the score lines 29', and a medial cut 32 is formed in the end walls 27 and 28 extending from the opening 31 to the outer edge of the end wall to permit a tubular element such as a pipe to be inserted into the opening 29.

Each of the end walls 27 and 28 are connected to fastening flaps 34 adapted to be folded inwardly along scores 35. The flaps 34 are separated from the adjacent tuck flaps 24 by means of cuts 36 extending to the confluence of the score lines 22 and 26. Each of the fastening flaps 34 is provided at its end remote from the end walls 27 or 28 with locking tabs 37 adapted to be tucked into slots 38 appropriately positioned in the side wall flaps 15 and 16.

Figure 2:
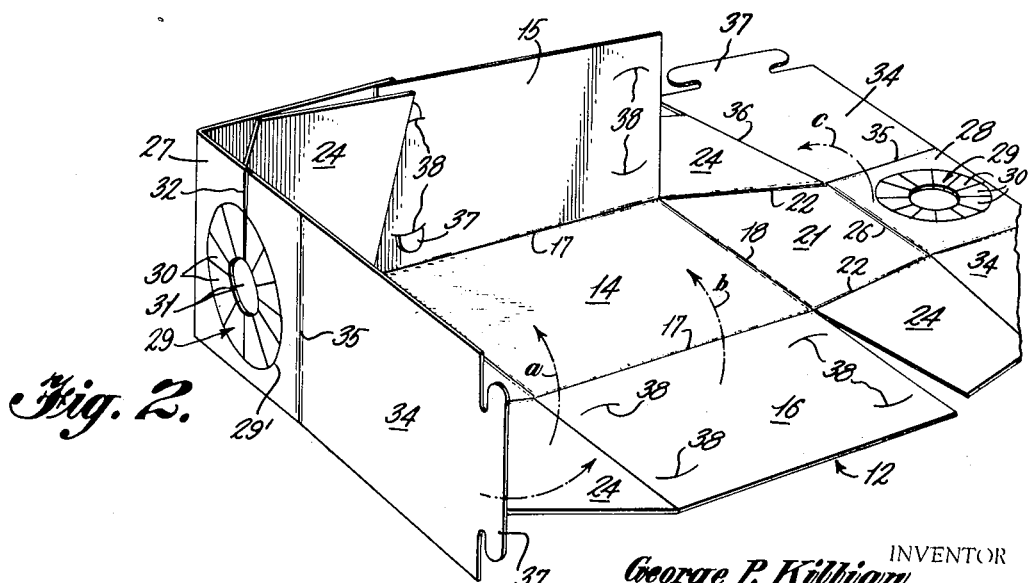
Figure 2 is a perspective view of a collapsible mold trough embodying the present invention illustrating the manner in which the various portions of the blank are manipulated to assemble the mold trough.

Assembly of the blank 12 into the erected, upwardly opening mold is as follows, reference being had particularly to Figure 2.

With the bottom portion 14 lying on a flat surface, tuck flaps 24 are folded into an erect position along the score lines 22 to a position substantially perpendicular to the bottom 14, as indicated by the arrow *a*. The side wall flaps 15 and 16 are then folded upwardly along score lines 17 at the lateral edges of the bottom 14 to a position overlying the edges of the tuck flaps 24, as indicated by the arrow *b*.

The end walls 27 are folded upwardly along the score lines 26, as indicated by the arrow *c*. The fastening flaps 34 which have then been moved into an erect position along with the end walls 27, are folded inwardly along the scores 35, overlying the tuck flaps 24 and the adjacent portion of the side wall flaps 15 and 16, and the locking tabs 37 on the ends of the fastening flaps 34 are then tucked into the complementary slots 38 formed in the side wall flaps 15 and 16. It will be observed that the isosceles trapezoidal shape of the bottom portions 20 and 21 causes these portions to be inclined upwardly from the central bottom portion 14 when the fastening flaps 34 are brought into proper position to register the locking tabs 37 with the slots 38.

The resulting upwardly opening trough is conveniently designed to retain molten material for coating pipe joints in the desired shape and dimension relative to the corresponding characteristics of the joint. It will be noted that no exposed cracks or slits opening directly from the interior of the trough through the external walls thereof exist, as the tuck flaps 24 are so locked in the final assemblage as to overlie the vertical edges of the side flaps 15 and 16 when in erected position and prevent seepage of the molten material through the area between the overlying faces of the side wall flaps 15 and 16 into the fastening flaps 34.

As indicated in the detailed illustration in Figure 3, the pipe sections to be joined, indicated by the reference character 41, are provided with a coating 42 adapted to resist the corrosive influence of soil upon the steel pipe 41. Such coating 42 terminating a small distance from the end of each of the pipe sections 41 leaves an exposed steel pipe surface 43 at the ends to be coupled. The particular coupling illustrated is known in the trades as a dresser coupling indicated by the reference character 44, although it is to be understood that other known coupling elements such as the screw type dresser joint may be employed.

These dresser joints generally include a plurality of flanged clamping plates, as indicated at 45, or like elements which are of substantially larger dimension than the diameter of the pipe sections 41 but which must be thoroughly encased in the coating material to avoid corrosion of the joint. It will be noted from the illustration, Figure 3, that the mold trough 10 is appropriately dimensioned to dispose the sides of the trough formed by the side wall flaps 15 and 16, fastening flaps 34 and tuck flaps 24 a suitable distance away from the edges of the flange plates 45 to insure adequate coating of these elements.

The assembled mold trough 10 is coupled to the pipe sections 41 in surrounding relation with the joint 40 by springing the end wall members 27 open along the slit 32 formed therein, and forcing the pipe sections 41 through the opening thus formed into the central opening defined by the circular score 29' and orange peel sectors 30. As indicated in Figures 3 and 4, the orange peel sectors are forced outwardly of the end walls 27 to a position overlying the coated portion 42 of the pipe sections 41, and are bound thereto by means of cord or the like 46 to retain the trough properly positioned relative to the joint 40 and the ends of the coating 42. After the pipe sections 41 have been seated in the central opening 29 of the end wall, the slit 32 is sealed by means of suitable adhesive elements such as a Scotch tape tab 47.

This assembled unit is then in proper form for the molten coating material, such as hot pipe coating enamel formed from pitch, asphalt or bituminous products, to be poured into the mold trough 10 in sufficient quantity to completely fill the trough.

This molten coating material is preferably of the same or a similar composition as the coating 42 on the pipe sections, so that a continuous homogeneous coating about the pipe and joints results.

It will be seen that the present device will represent a substantial saving in labor costs involved in laying out pipe lines for city gas or the like, as a simple and inexpensive mold is provided which can be stored in flat, stacked condition, which is constructed from very expandable materials, and which is sufficiently simple to be assembled by unskilled labor. The trough is so designed relative to the dimensions of the various joint parts, by allocation and spacing of the side walls relative to the axis of the pipe sections, as to insure proper coating of desired thickness over all the exposed parts of the pipe joint.

While but one specific embodiment of the invention has been particularly shown and described, it is distinctly understood that the invention is not limited thereto, but that various modifications may be made in the invention without departing from the spirit and scope thereof. It is desired, therefore, that only such limitations shall be placed on the invention as are imposed by the prior art and are set forth in the appended claims.

What is claimed is:

1. An upwardly opening mold trough folded from an integral blank of sheet material and adapted to be fitted about a field joint joining pipe sections for forming a completely encasing molded envelope of corrosion-resistant material about the field joint and adjacent surfaces of the pipe sections, comprising joined bottom, side and end walls folded with respect to one another to form an upwardly opening trough of substantially U-shaped longitudinal and transverse cross section, said bottom and side walls each having rectangular central panel portions disposed parallel to the axis of the pipe sections and end portions joined to the opposing end edges of the panel portions along fold lines and extending from said panel portions to said end walls, each of said end portions of said bottom and side walls being inclined to the plane of said central panel portions and converging in the direction of said end walls toward the axis of said pipe sections to form convergingly tapered end portions of said trough, the end walls being joined along fold lines to said bottom end portions remote from said central panel portion and extending upright from said bottom wall to be disposed at spaced points oppositely directed along the pipe sections from said field joint, said end walls having axially aligned openings centrally disposed therein complementary to the periphery of said pipe sections to accommodate said pipe sections and position said side and bottom walls in preselected spaced relation to the surfaces of said field joint to be coated, and having slits therein extending from said openings to a free edge of said end walls to permit said end walls to be spread about the pipe sections and seat the pipe sections in said opening, and fastening flaps joined along fold lines to the lateral edges of said end walls and extending from said end walls in overlying relation to the side wall end portions, and means for securing said fastening flaps to said side walls.

2. An upwardly opening mold trough folded from an integral blank of sheet material and adapted to be fitted about a field joint joining pipe sections for forming a completely encasing molded envelope of corrosion-resistant material about the field joint and adjacent surfaces of the pipe sections, comprising joined bottom, side and end walls folded with respect to one another to form an upwardly opening trough of substantially U-shaped longitudinal and transverse cross section, said bottom and side walls each having rectangular central panel portions disposed parallel to the axis of the pipe sections and end portions joined to the opposing end edges of the panel portions along fold lines and extending from said panel portions to said end walls, each of said end portions of said bottom and side walls being inclined to the plane of said central panel portions and converging in the direction of said end walls toward the axis of said pipe sections to form convergingly tapered end portions of said trough, the end walls being joined along fold lines to said bottom end portions remote from said central panel portion and extending upright from said bottom wall to be disposed at spaced points oppositely directed along the pipe sections from said field joint, said end walls having axially aligned openings centrally disposed therein complementary to the periphery of said pipe sections to accommodate said pipe sections and position said side and bottom walls in preselected spaced relation to the surfaces of said field joint to be coated, and having slits therein extending from said openings to a free edge of said end walls to permit said end walls to be spread about the pipe sections and seat the pipe sections in said opening, fastening flaps substantially coextensive with said side wall end portions joined along fold lines to the opposing lateral edges of said end walls and extending from said end walls in overlying relation to their adjacent side wall end portions, and means for securing the ends of said fastening flaps to said side walls.

3. An upwardly opening mold trough formed from an integral blank of cardboard sheet material and adapted to be fitted about a field joint including a dresser coupling and connected pipe sections for forming a completely encasing molded envelope of corrosion-resistant material about the dresser coupling and adjacent surfaces of the pipe sections, comprising a bottom wall having a rectangular central panel longitudinally coextensive with said dresser coupling and disposed parallel to the axis of the pipe sections and a pair of oppositely extending inclined end panels of truncated triangular shape converging away from said central panel and joined thereto along transverse fold lines, opposing side walls folded upright from said bottom wall, said side walls each having a rectangular central panel coextensive with said bottom central panel and joined along fold lines to the lateral edges of said bottom central panel and end panels of truncated right triangular shape joined along fold lines to the opposite vertical edges of said side wall central panel and inclining therefrom toward the axis of the pipe sections to form with said bottom a trough having convergingly tapered end regions, and rectangular end walls joined along fold lines to the end edges of said bottom wall end portions remote from said bottom central panel, said end walls extending upright from said bottom wall to be disposed at spaced points oppositely directed along the pipe sections from said dresser coupling, said end walls having aligned circular openings centrally disposed therein complementary to the outer diameter of said pipe sections to accommodate said pipe sections and position said side and bottom walls in preselected spaced relation to the surfaces of said field joint to be coated, said end walls having slits therein extending from said openings to the free edges of said end walls to permit said end walls to be spread about the pipe sections and seat the pipe sections in said openings, fastening flaps of truncated right triangular shape coextensive with said side wall end portions and joined along fold lines to the lateral edges of said end walls, said fastening flaps extending from said end walls in overlying relation to their adjacent side wall end portions and having means on the free ends thereof for securing the same to the lateral edges of said bottom wall end portions and folded upwardly to underlie the junctures between said fastening flaps and said side walls.

4. The combination recited in claim 3 wherein said pipe-receiving openings and said end walls are formed of circular scores of substantially the circular cross section of the peripheries of said pipe sections and hinged orange peel sectors integral with said end walls and radiating inwardly from said scores to be bent outwardly of the trough to overlie and be bound to the surface of said pipe.

References Cited in the file of this patent

UNITED STATES PATENTS

| | | |
|---|---|---|
| 1,462,077 | Weston | July 17, 1923 |
| 1,585,430 | Smith et al. | May 18, 1926 |
| 1,861,206 | Burgess | May 31, 1932 |
| 1,865,268 | Morris | June 28, 1932 |
| 1,948,083 | Warner | Feb. 20, 1934 |
| 2,554,283 | Snyder | Mar. 6, 1951 |